Oct. 21, 1952     H. ALLEN     2,614,520

MECHANICAL ADVANTAGE OPERATOR

Filed March 30, 1950

HERBERT ALLEN
*INVENTOR.*

BY *Browning & Simms*

*ATTORNEYS*

Patented Oct. 21, 1952

2,614,520

UNITED STATES PATENT OFFICE 2,614,520

MECHANICAL ADVANTAGE OPERATOR

Herbert Allen, Houston, Tex., assignor to Cameron Iron Works Inc., Houston, Tex., a corporation of Texas Application March 30, 1950, Serial No. 152,914

6 Claims. (Cl. 116—125)

This invention relates to improvements in actuating mechanism for valves and the sub-combination of mechanical advantage operator for turning the operating shaft of a valve and adapted for use in fields other than the valve art. The description of the operator as it relates to valves is by way of illustration only.

Valves used in controlling flow of fluids under high pressures are difficult to operate, often requiring the use of long levers or wrenches applied to the usual handwheel. Also, in certain types of valves, such as the plug valves disclosed in my co-pending applications for United States Letters Patent identified by Serial Number 135,966, filed December 30, 1949; Serial Number 130,972, filed December 3, 1949; and Serial Number 152,911, filed March 30, 1950, the operating wrench or handwheel is turned through such a limited arc as to effect a very rapid opening and closing action which is not always desirable when the valves are in high pressure operation.

An object of this invention is to provide an operator for turning a journaled shaft, which is rugged, effective in operation and may be economically manufactured.

Another object is to provide a gear operator which may be used as a readily releasable accessory for a shaft to be turned and capable of providing a substantial mechanical advantage for turning of the shaft.

A further object is to provide a gear operator for turning the operating shaft of a valve in which a single set screw secures the operator on the valve.

Still another object is to provide an operator of the character described wherein the drive shaft may bear an indicator which will occupy predetermined rotative positions when the valve is fully open and fully shut.

A still further object is to provide a gear operator wherein a single part provides the operator housing, the crank member for the shaft to be turned, and a journal for the drive shaft.

Yet another object is to provide a gear operator of the character described which may be easily secured in operative position upon a valve and readily removed therefrom.

Yet a further object is to provide a gear operator for a plug type valve of the character described in which the hand part of the gear operator, to open and close the valve, is rotated in the same directional senses respectively as would be the hand part of the valve if the valve were used without the gear operator.

Other and further objects of the invention will appear as the description proceeds.

In the accompanying drawings forming a part of the instant specification and wherein like reference numerals are used in the various views to indicate like parts:

Figure 1:
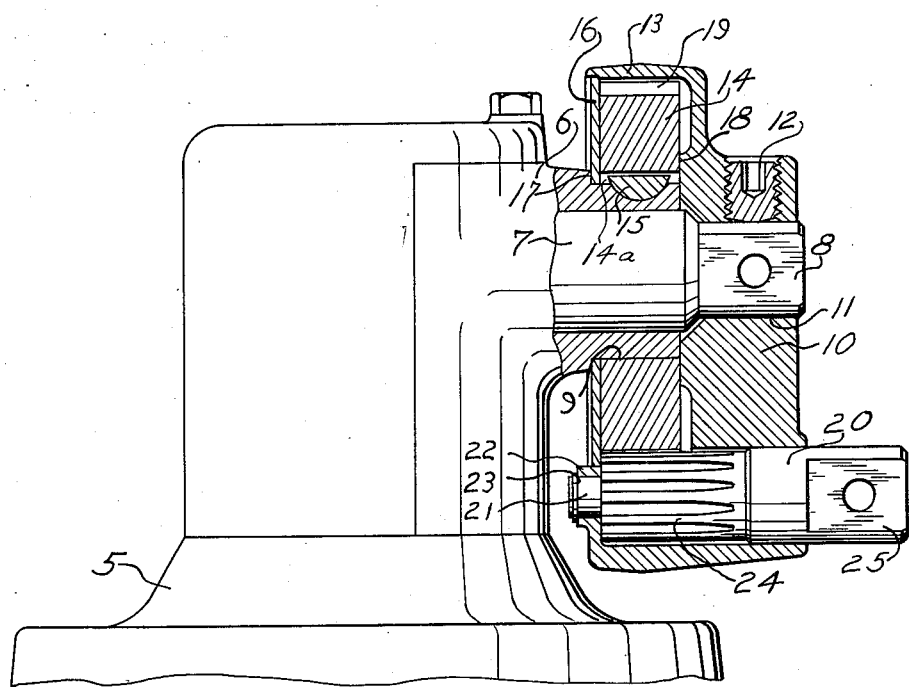
Fig. 1 is a view partially in elevation and partially in vertical cross-section showing an operator embodying this invention and in position upon a valve so as to facilitate turning of the operating shaft of the valve.

Considering the drawings in general, the arrangement comprises a shaft to be turned, which is rotatably mounted and an operator including a crank member secured to the shaft to be turned, a drive ring concentric with the shaft to be turned and secured to the journal for the shaft and a drive shaft journaled in the crank member and having a drive connection with the ring. The operator is releasably secured to the shaft to be turned by a single lock part which may be a set screw. Preferably, the crank member is fabricated so as to provide a housing for the operator and has a bearing surface for securing the drive ring in place upon the journal for the shaft to be turned.

Referring in detail to the embodiment shown in the drawings, the numeral 5 designates a body part or the bonnet of a valve as disclosed in said co-pending application, Serial Number 135,966. In the interest of simplicity, the disclosure of this valve in said latter application is incorporated by reference and will not be repeated herein. The valve body includes a part or hub 6 in which the operating shaft 7 is journaled. The shaft extends exteriorly of the hub and has a wrench receiving part 8 at its outer end. When used herein, the term "operating shaft" is intended to include a valve stem in that type of valve where the stem itself receives a handwheel or the like to facilitate manipulation of the valve.

The hub has a bearing surface 9 turned exteriorly thereof so as to be concentric with shaft 7. The operator is adapted to fit over the bearing surface 9 and to be releasably secured to the valve. In many installations in which the valve may be employed, the operator is not required, but it may be readily and economically attached to the valve when desired.

Figure 2:
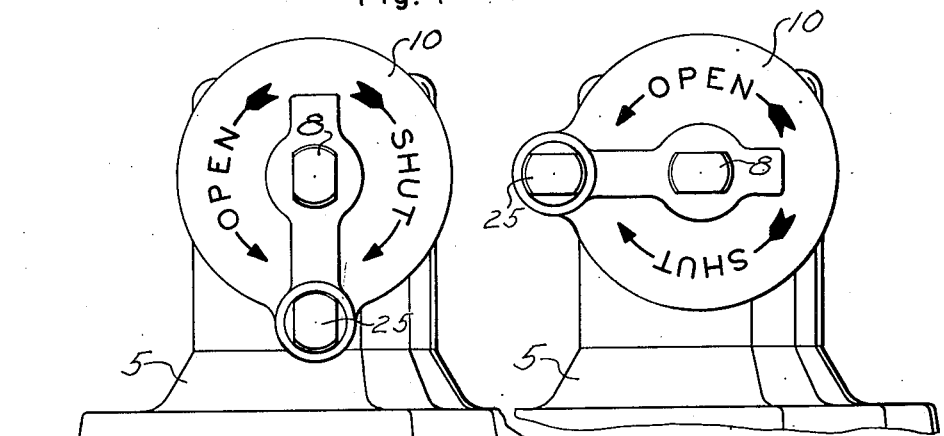
Fig. 2 is a front elevation, upon a reduced scale, of the arrangement shown in Fig. 1 and showing the operator in open position.
Figure 3:
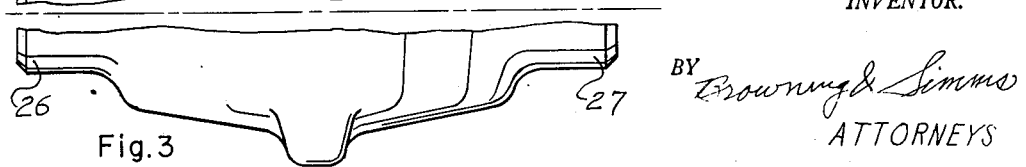
Fig. 3 is a view similar to Fig. 2 showing the operator in a position with the valve shut.

Referring to the gear operator itself, it comprises a crank member 10 having an opening 11 for fitting over the wrench receiving part 8. The crank member may be secured in place by a suitable lock part, as set screw 12. This crank member, when viewed from the front as in Figs. 2 and 3, is seen to be substantially circular so as to provide a housing for the mechanical advantage drive mechanism. The member 10 has an outturned flange or skirt 13 in which a drive ring 14 resides when the operator is assembled in operative position.

The drive ring 14 is secured about the hub 6 and bears against surface 9. It is secured against rotation on the hub by a Woodruff key 15 secured in a hollow formed in surface 9 and which resides in a slot 14a formed internally of ring 14. In order to complete the housing for the ring 14, it is preferred to insert a washer 16 upon the hub between the ring and shoulder 17 formed on the body part. The ring 14 may be held against axial movement on the hub by a bearing surface 18 preferably milled out on the interior of member 10, which abuts the face of the ring. Thus, the set screw 12 not only secures the member 10 on the wrench part of the shaft but also serves to hold the entire assembly on the valve.

The drive ring 14 preferably is a gear ring having its gear teeth 19 concentrically arranged relative to the shaft 7.

The crank member 10 has journaled therein a drive shaft 20. This shaft has a pin 21 extending through a bearing 22 formed on member 10 and a spring clip 23, residing within a groove formed on pin 21, retains the shaft 20 against axial movement in its journal. The shaft 20 has a drive connection with drive ring 14. This connection may be in the form of the teeth 24, carried by shaft 20 meshing with teeth 19 of the drive ring. Thus, the shaft 20 may be a pinion meshing with gear ring 14. The outer end of this pinion or shaft 20 may have a non-circular wrench part 25 formed by flattening opposite sides thereof.

Where the operator is to be used on the type valve shown in said co-pending application, Serial Number 135,966, it is preferred that the ratio of the drive connection between the shaft 20 and the drive ring 14 be such that in fully open and fully shut positions, as shown in Figs. 2 and 3 respectively, the wrench part 25 will reside in predetermined rotative positions so that its end surface provides an indicator. Thus, when the indicator surface of wrench part 25 is parallel to the flow passage through the valve as shown in Fig. 2 and with the operator in one extreme operational position, it will indicate that the valve is open, while if the part 25 is transverse the valve passageway or vertical, as shown in Fig. 3 and the operator is in an extreme operational position, it will indicate that the valve is shut. In the arrangement shown, wrench part 8 serves a similar purpose.

The assembly and operation of the operator of this invention will be described in conjunction with its use upon a valve as shown in said co-pending application, Serial Number 135,966. To assemble the operator upon the valve, the washer 16 is first placed over the hub 6 of the valve body and abuts against the shoulder provided at the inner end of cylindrical surface 9. The Woodruff key 15 is then placed in position in the hollowed out portion of surface 9 and gear ring 14 inserted over the hub, with slot 14a receiving the key. The key 15 in slot 14a prevents relative rotation of the drive ring 14 with the valve body. The crank member 10 is then inserted in place with opening 11 engaging wrench part 8 of the valve operating shaft. Set screw 12 holds the crank member in position. In this assembled position, the crank member 10 serves as a housing with skirt 13 encircling gear ring 14 and abutting washer 16 to complete the encasement of the gear ring. It will be understood that the assembly is very simple and that the single part 12 holds the gear operator in assembled position relative to the valve.

The pinion 24 meshes with the gear ring 14 when the operator is in assembled position. In the Fig. 1 showing, the valve is in its fully shut position as also shown in Fig. 3. With a suitable wrench or handwheel, not shown in the drawings, placed over the wrench receiving part 25 of shaft 20, counterclockwise rotation of the handwheel will cause the pinion 20 to travel in a counterclockwise direction about the gear ring 14. This imparts rotation to crank member 10 about the rotational axis of shaft 7, turning shaft 7 in a direction to open the valve. When this operation is continued until the gear operator is in its Fig. 2 position, through substantially 270°, relative to shaft 7, then the end of crank part 25 is in alignment with the end of crank part 8 and is in position indicating that the valve is open for it is parallel to the flow line through the valve. The flow line through the valve extends from the fittings 26 and 27 of the valve body.

To shut the valve, the crank part 25 is rotated in a clockwise sense and again the pinion drives over the drive ring 14 and when it reaches its extreme position, as shown in Fig. 3, the end of crank part 25 is transverse the flow passage through the valve body and this indicates that the valve is shut.

It is believed apparent from the foregoing description of the gear operator that in opening the valve, the wrench part 25 is rotated in the same directional sense as the wrench part 8 of the valve actuating mechanism. Also, in the closing operation, the hand part of the gear operator is rotated in the same directional sense as the wrench part 8. Thus, a person, when opening and closing the valve, turns the hand part in the same directional sense as would be required to turn the hand part of the valve itself were the gear operator not used. This cuts down the likelihood of a person making a mistake in the opening and closing of the valve.

Considerable mechanical advantage is provided by the operator due to the ratio between gear ring 14 and pinion 24. Also, this materially slows up the operation of the valve which under many high pressure operating conditions is desirable.

From the foregoing it will be seen that this invention is one well adapted to attain all of the ends and objects herein above set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In combination a valve, a valve body part with a hub, a valve operating shaft adapted to be rotated to open and close said valve and journaled in the hub with its free end extending from the hub and having a wrench receiving part, a bearing surface exteriorly of the hub, a gear ring mounted on the bearing surface and keyed to the hub to prevent rotation therebetween and yet to permit ready demounting of the gear ring from the hub, said gear ring being further arranged with its gear teeth concentrically arranged about the operating shaft, a housing covering the gear ring and releasably secured to the wrench securing part of the operating shaft against movement relative thereto, said housing bearing against the gear ring to hold it upon the hub, and a pinion journaled in the housing meshing with the gear ring.

2. The combination of claim 1 wherein the pinion carries an indicator and the gear ratio of the pinion and gear ring is such that the indicator is in predetermined rotative positions when said valve is in fully open and fully closed positions.

3. In an operating mechanism for a valve wherein the valve is opened and closed to fluid flow by rotation of a journaled rotatable shaft, the combination which comprises, a housing, a first means carried by the housing for non-rotatably receiving said rotatable shaft, a drive means including a drive shaft journaled in the housing eccentrically of the first means, a drive ring mountable within the housing for relative rotation thereto and concentric to the first means, a drive connection between the drive shaft and the drive ring, said drive shaft carrying an indicator and the ratio of rotational movement between the drive shaft and the drive ring being such that the indicator is in a different predetermined rotative position when said valve is fully open and when fully closed.

4. The combination which comprises, a valve body, a valve member for opening and closing a fluid passageway through the body responsive to rotation of an operating shaft, a hub connected to said valve body and carrying said operating shaft journaled therein, said shaft having a free end extending from said hub and having a wrench receiving part, a bearing surface exteriorly of the hub, a gear ring non-rotatably mounted on the bearing surface with its gear teeth concentrically arranged about the operating shaft, a housing covering the gear ring and releasably secured to the wrench securing part of the operating shaft against movement relative thereto, said housing bearing against the gear ring to hold it upon the hub, a pinion journaled in the housing and meshing with the gear ring and an indicator carried on said pinion, the gear ratio of the pinion and the gear ring being such that the indicator is in predetermined rotative positions when said valve is in fully opened and closed positions.

5. The combination of claim 4 wherein said indicator is an elongated part so positioned that it is normal to the direction of fluid flow when said pinion has been turned to fully close said valve and is parallel to said flow when said pinion has been rotated to fully open said valve.

6. The combination of claim 4 wherein said operating shaft carries an elongated indicia for determining when said valve is in fully open and fully closed position, said pinion carries an elongated indicia adapted to rotate about the axis of the pinion upon rotation of the latter, and the gear ratio between the pinion and the gear ring being such that the two indica are parallel when said valve is in fully open position and also parallel when in fully closed position.

HERBERT ALLEN.

REFERENCES CITED

The following references are of record in the file of this patent:

UNITED STATES PATENTS

| Number | Name | Date |
|---|---|---|
| 604,417 | Richardson | May 24, 1898 |
| 631,208 | Frazeur | Aug. 15, 1899 |
| 1,118,285 | Johnson | Nov. 24, 1914 |
| 1,495,930 | Sing | May 27, 1924 |
| 1,497,494 | Fetty | June 10, 1924 |